United States Patent [19]

Sicka et al.

[11] Patent Number: 4,578,024
[45] Date of Patent: Mar. 25, 1986

[54] COEXTRUSION APPARATUS

[75] Inventors: Richard W. Sicka, Brecksville; Dale A. Tompkins, Akron, both of Ohio

[73] Assignee: The Firestone Tire & Rubber Company, Akron, Ohio

[21] Appl. No.: 704,243

[22] Filed: Feb. 22, 1985

[51] Int. Cl.[4] .............................. B29F 3/04; B29F 3/10
[52] U.S. Cl. .................................... 425/114; 425/133.1
[58] Field of Search ............................ 425/114, 133.1; 264/173, 174

[56] References Cited

U.S. PATENT DOCUMENTS

| | | | |
|---|---|---|---|
| 2,874,411 | 2/1959 | Berquist | 18/13 |
| 3,146,508 | 9/1964 | Berliner et al. | 425/114 |
| 3,183,135 | 5/1965 | Berquist | 156/126 |
| 3,582,417 | 6/1971 | Plate et al. | 425/114 X |
| 3,615,987 | 10/1971 | Blatz | 156/133 |
| 3,694,292 | 9/1972 | Schippers et al. | 425/133.1 X |
| 3,697,209 | 10/1972 | Schiesser | 425/114 X |
| 4,047,868 | 9/1977 | Kudo et al. | 425/133.1 |
| 4,050,867 | 9/1977 | Ferrentino et al. | 425/114 |
| 4,132,756 | 1/1979 | Ferrentino et al. | 264/174 |
| 4,150,929 | 4/1979 | Brandt | 425/114 |
| 4,152,104 | 5/1979 | Przytulla et al. | 425/133.1 X |
| 4,280,801 | 7/1981 | Wheeler, Jr. et al. | 425/133.1 X |
| 4,283,241 | 8/1981 | Hollmann | 156/117 |
| 4,472,126 | 9/1984 | Mitsui et al. | 425/133.1 X |
| 4,484,966 | 11/1984 | Kawamoto | 156/126 |
| 4,501,629 | 2/1985 | Satzler | 425/133.1 X |
| 4,517,039 | 5/1985 | Satzler | 425/133.1 X |
| 4,519,863 | 5/1985 | Landgraf et al. | 425/133.1 X |

Primary Examiner—J. Howard Flint, Jr.
Attorney, Agent, or Firm—Ernst H. Ruf

[57] ABSTRACT

A coextrusion head for producing a generally tubular elastomeric ply made up of first and second concentric tubular streams of elastomeric material having interposed, adjacent to their interface, a closely spaced array of parallel reinforcing elements wherein the coextrusion head includes a reinforcing element guide subassembly including a generally annular guide element as well as a mechanism for individually and independently directing and accurately positioning a circular array of uniformly spaced individual reinforcing elements. A generally annular inner die assembly cooperates with the annular guide element to form a first distribution channel and a generally annular outer die assembly also cooperates with the annular guide element to form a second distribution channel, with the guide element cooperating with the inner and outer die assemblies to produce concentric first and second tubular extrudate paths which thereafter merge into a third such path with the individual reinforcing elements being introduced into the interface between the first and second tubular streams of elastic material as they merge into a third tubular stream so as to produce the tubular elastomeric reinforced ply. A method for coextruding an annular seamless component of reinforced elastomeric material is also presented.

32 Claims, 17 Drawing Figures

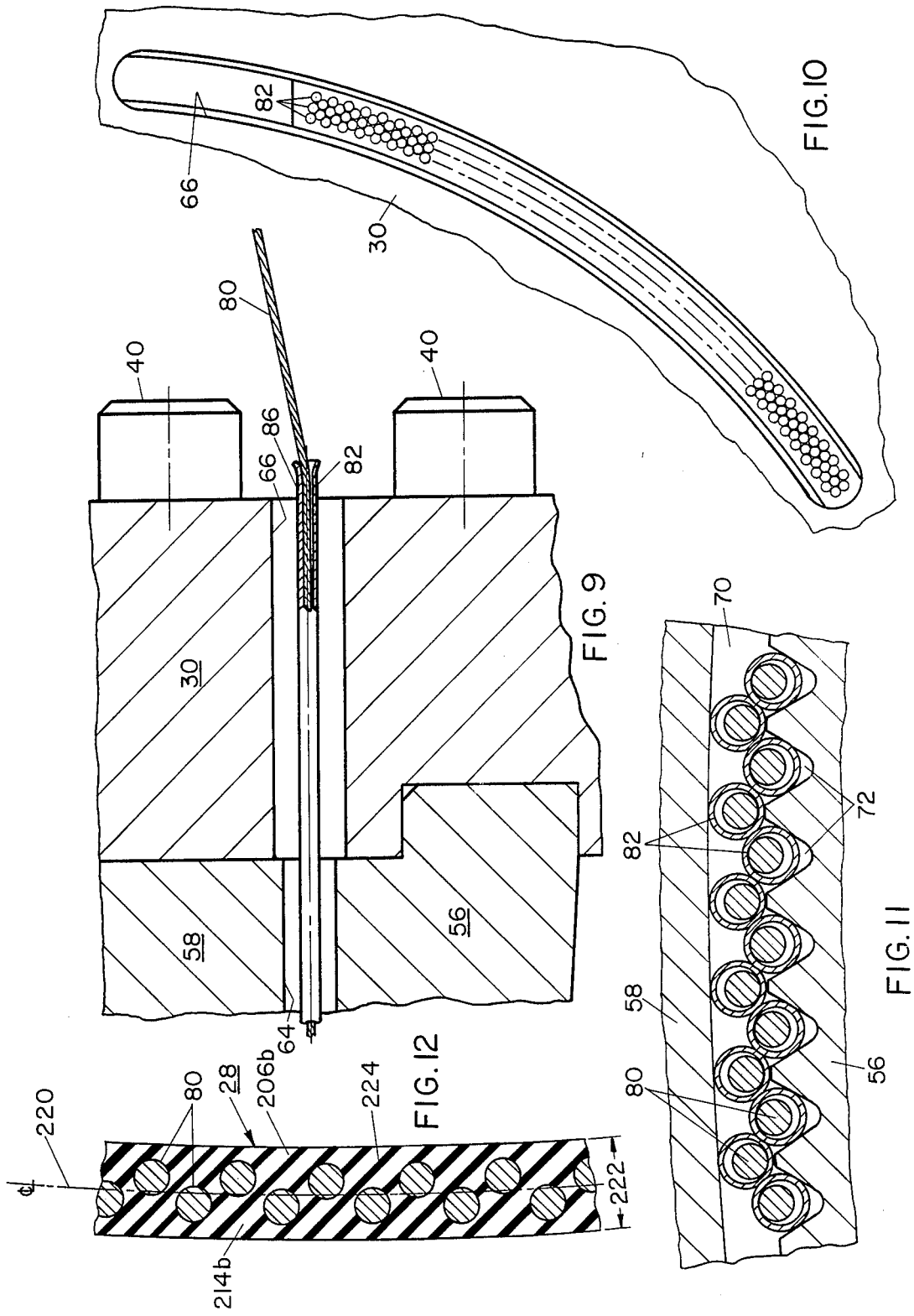

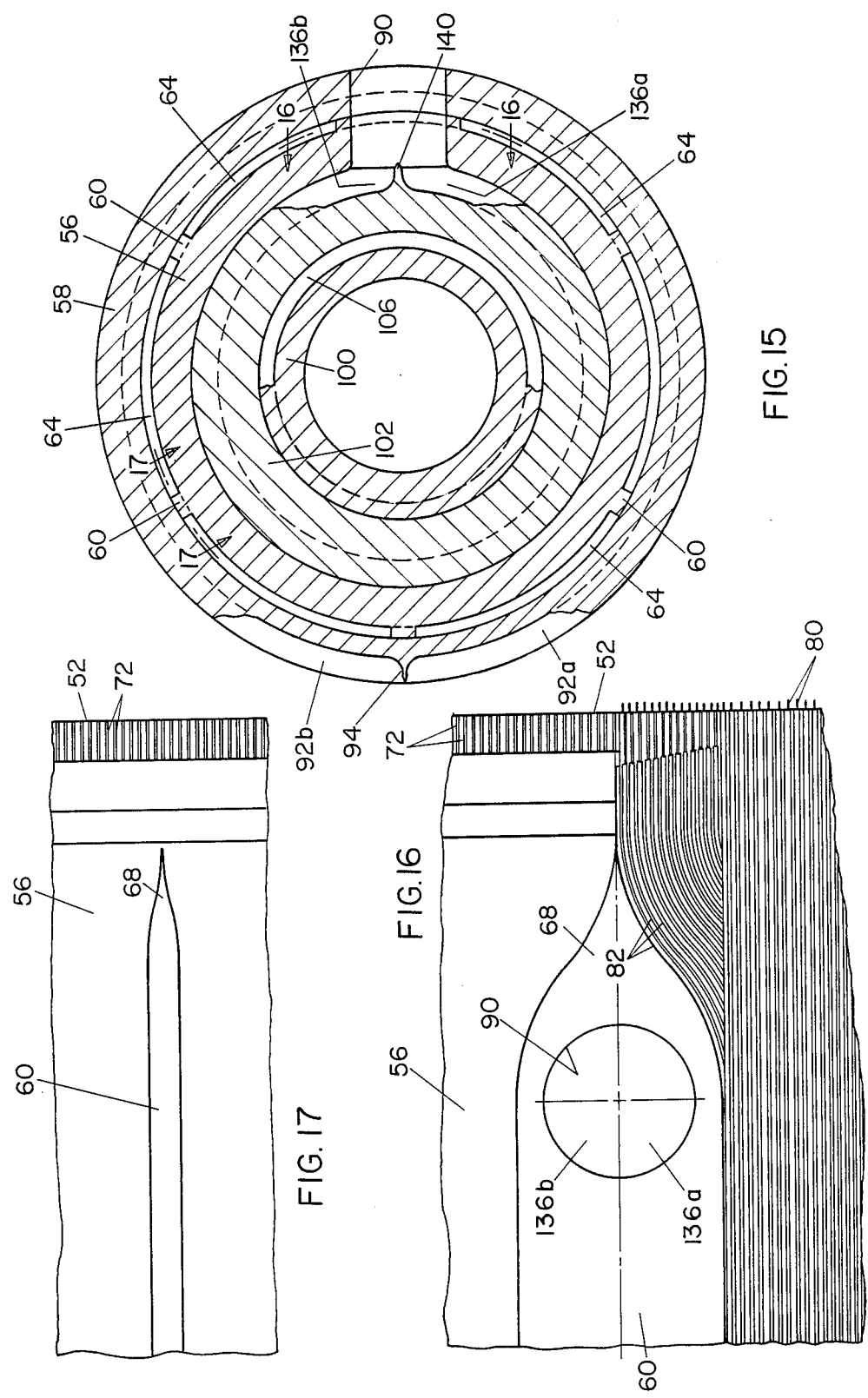

COEXTRUSION APPARATUS

TECHNICAL FIELD

The field of art to which this invention pertains is that of a coextrusion apparatus and method, particularly for use in manufacturing annular seamless components of reinforced elastomeric material. Such articles, in the form of tubular elements or strips are useful in the production of a myriad of products, such as, for example pneumatic tires, specifically, body plies for radial tires.

BACKGROUND OF THE ART

Tubular components or articles, such as pneumatic tire body plies have previously generally been built by utilizing woven fabric and calendering same with rubber stock which, when cut to size, entails wrapping the sheet component around a tire building drum and overlapping the ends of the sheet to produce an annulus with a generally axially extending seam. Such a seam is generally disadvantageous in that the discontinuity in the now annular component may produce not only weak spots, but also an asymmetrical construction tending to cause a force unbalance in the completed tire.

In order to avoid this lapped or seamed construction, extrusion has been employed in the prior art in the case of knit tubular fabric and annular seamless elastomeric tubes having reinforcement cords therein disposed generally longitudinally of the tube during extrusion. However, these attempts have not been commercially successful since there was insufficient control in terms of the placement and spacing of the cords to obtain the desired high performance required in modern engineered constructions.

The prior art has not successfully addressed a coextrusion apparatus and method to produce an article having a circular array of small diameter cords of a very large number (500-2,500) cords in a thin walled (0.070 inches) annular tubing ranging up to 16 inches or more in diameter. In tire construction, for example, the uniformity of spacing of the reinforcing cords of the body ply is crucial to the subsequent tire building steps, and uniformity of expansion is a direct result of uniform spacing of the reinforcement cords.

U.S. Pat. Nos. 2,874,411 and 3,183,135, both to Berquist, disclose an apparatus and method, respectively, for manufacturing a tire. FIG. 4 of the former discloses individual strands, from a bank of spools, passing into an annular guiding aperture of a die head and passing out through an annular aperture in an exit sleeve. A mandrel supports the strands and causes the plastic, supplied by a single extruder, to form a tubular structure in which the strands are parallel. A floating mandrel is utilized and seeks its own location in the outlet and center of the tubular structure so as to prevent the tube from collapsing under the pressure of the plastic. The method of U.S. Pat. No. 3,183,135 includes forming a hollow circumferentially endless cylinder by extruding parallel strands, substantially longitudinal of a floating mandrel, while simultaneously coating and bridging the strands with an adhesive insulating coating, using the apparatus of U.S. Pat. No. 2,874,411.

U.S. Pat. No. 3,615,987 to Blatz is directed to a method of extruding continuous annular seamless components of rubber material, containing reinforcement filaments embedded therein, comprising the steps of extruding a tube of this material, cutting the extruded tube into predetermined lengths, and positioning the lengths onto a tire building drum. The extrusion apparatus includes an extrusion head having a nozzle mounted partly within the outlet of the extrusion head so that the interior surfaces of the nozzle and the extrusion head together form a smooth frustoconical surface which diverges in the direction of the flow of the material being extruded. A conical form core, disposed within the extrusion head outlet portion and the nozzle, is axially movable therein, thus causing gradual consolidation of the extruded material. A plurality of substantially radially extending ceramic inserts is arranged on the periphery of the nozzle and communicates with the passage between the core and the nozzle, with these inserts serving as the inlets for the reinforcing cords. However, the cords are forced to undergo a 90° transition upon entering the single annular stream extrudate.

U.S. Pat. No. 4,283,241 to Hollmann discloses a method and apparatus for preparing carcass plies for radial tires wherein the apparatus includes extruding means including a plurality of nozzles for separately extruding, from each nozzle, a strand of vulcanizable rubber composition, wherein the nozzles are arranged to extrude a plurality of strands in a tubular array. Elongated reinforcing members are fed to the nozzles respectively for discharging therefrom respective reinforcing members individually coated with the rubber composition. However, textile machinery means are utilized for winding the coated strands with relatively weak transfer circumferential strands. It appears that but a single extruder is utilized.

U.S. Pat. No. 4,484,966 to Kawamoto discloses a process of manufacturing carcass bands which are reinforced by cords and are employed in fabricating a radial tire. This process includes the steps of unwinding the plurality of cords from a plurality of reels, traveling the cords through apertures formed in guide members and entering a rubber coating mechanism and thereafter coating the cords with rubber material by means of the rubber coating mechanism to produce a continuous cylindrical tube having cords embedded therein. A pair of controlled rollers, upstream from the coating mechanism, is utilized for maintaining the cords even in tension and to prevent their twisting. A plurality of guide members, immediately upstream of the coating mechanism, guides the cords prior to entering the passageways within the rubber coating mechanism. Again, only a single hollow stream of elastomeric material is utilized.

U.S. Pat. No. 4,050,867 to Ferrentino et al. discloses an extrusion head for extruding elastomeric material on at least two filaments having a diameter on the order of 0.1 mm and having a high modulus of elasticity while maintaining a constant spacing therebetween. The nature of the cord guides illustrated in the patent is not adequate to control a large number of textile cords and prevent entanglement. U.S. Pat. No. 4,132,756, also to Ferrentino et al. and a division of U.S. Pat. No. 4,050,867, is cited for its disclosure of an extrusion process wherein the five filaments (F and W) are subjected to mechanical tension applied from the outside of the extrusion head in any conventional manner, thereby providing a cable with a constant spacing between the filaments.

U.S. Pat. No. 4,150,929 to Brandt pertains to the preparation of miniature ribbon cables having up to 100 fine conductor wires of a diameter of 0.010 to 0.015 inches. The gauge of the extrudate of the present invention must be controlled within a few mils whereas the adjustment of the die position of Brandt, via rocking set screws 53 and 54, is inadequate to control the gage over the large circumferential dimension characteristic of the present composite tire component. While Brandt's quills 37 are formed of thin-walled material, such as hypodermic needle stock, their delivery ends are swaged down to reduce the internal diameter to a dimension close to the external diameter of the wires. Swaged ends, as those in Brandt, would require replacement if elastomeric material backs into the flow tube should a cord break. In the apparatus of the present invention, not only is the backflow slight, but if a reinforcing element break is detected while running, rethreading can even be accomplished under operating conditions.

U.S. Pat. No. 3,697,209 to Schiesser discloses an apparatus for manufacturing reinforced tubings from plastic materials wherein a first inner layer of the tubing wall is continuously extruded, in an extruder head, over a guide serving to form the cavity of the tubing whereinafter strand-like reinforcing material is continuously applied in a longitudinal direction of the tubing on the outer surface of this inner layer which is thereafter coated by at least one further or outer layer of a plastic substance. The apparatus and method of Schiesser differ, among other things, from the present invention in that the latter introduces the reinforcing elements into the interface of two merging circumferentially continuous concentric streams.

DISCLOSURE OF THE INVENTION

The present invention provides a solution to the noted prior art problems in terms of apparatus by producing a generally tubular elastomeric ply made up of first and second concentric tubular streams of elastomeric material having interposed, adjacent to their common interface, a closely and uniformly spaced array of parallel reinforcing elements.

The coextrusion head of the present invention includes a reinforcing element guide subassembly, including a generally annular guide element having inner and outer wall surfaces, as well as axially-directed means for individually and independently directing and accurately positioning a circular array of closely and uniformly spaced individual reinforcing elements. A generally annular inner die assembly, having inner and outer wall surfaces, is concentric with and located substantially radially inwardly of the annular guide element, wherein one or both of the annular guide elements and/or the inner die assembly have a 360° annular contoured channel in their wall surfaces, so that this channel, together with its opposed wall surface, forms a first distribution channel. A generally outer die assembly, having inner and outer wall surfaces, is concentric and located substantially radially outwardly of the annular guide element, wherein one or both of the annular guide and/or the outer die assembly have a 360° annular channel in one of its wall surfaces, so that this channel together with its opposed wall surface, forms a second distribution channel.

The axial outer portions of the inner and outer wall surfaces of the annular guide element have converging portions that merge into an end portion having a narrow annular outer end surface. A portion of the inner die assembly outer wall surface and a portion of the annular guide element inner wall surface, both axially outward of the first distribution channel, cooperate to form a first generally tubular extrudate path. A portion of the annular guide element outer wall surface and a portion of the outer die assembly inner wall surface, both axially outward of the second distribution channel, cooperate to form a second generally tubular extrudate path.

The axially outermost portions of the inner wall surface of the outer die assembly and the outer wall surface of the inner die assembly also cooperate to form a third generally tubular extrudate path with the first and second extrudate paths merging together into this third path at the narrow annular end surface of the guide element.

First and second inlet streams of elastomeric material enter the first and second distribution channels and consequently the first and second annular tubular extrudate paths, respectively produce first and second tubular outlet streams which thereafter merge together into a third tubular outlet stream of elastomeric material in the third extrudate path, with individual reinforcing elements being introduced into the interface between the first and second outlet streams as they merge together into the third such stream to produce the tubular elastomeric ply that is internally reinforced with a closely and uniformly spaced array of parallel reinforcing elements.

The means for individually and independently directing and accurately positioning the individual reinforcing elements preferably take the form of at least one spaced array of adjacent thin walled, deformable, semi-rigid tubes, preferably of metallic construction. The narrow, annular outer end face of the annular guide element is coplanar with the axial outer end surfaces of the tubes, with the inlet portions of the tubes being flared in order to prevent chafing of the reinforcing elements.

In a preferred embodiment of the present invention, both the inner die assembly and the guide subassembly each have a 360° annular contoured channel in their outer wall surfaces, these channels together with their opposing wall surfaces forming the first and second distribution channels, respectively.

The reinforcing element guide subassembly includes a back plate, with first and second means mounted on the back plate and operatively interconnected with the inner and outer die assemblies, respectively, for independently translating the inner and outer die assemblies and the reinforcing element guide subassembly relative to one another.

A method of coextruding an annular seamless component of reinforced elastomeric material comprises the steps of producing a first annular hollow stream of elastomeric materials; producing a second annular hollow stream of elastomeric materials; producing a third annular hollow stream of elastomeric material from the first and second streams, wherein the third stream includes a common, annular merger interface between the first and second streams; and interposing, into the third stream at this interface, a closely spaced annular array of reinforcing elements parallel to the longitudinal axis of the third stream. Tubular components, such as tire body plies can be produced by circumferentially severing the annular seamless component into predetermined lengths. Sheets or strips can be produced by longitudinally severing the annular seamless component.

In a preferred embodiment of the present invention, the producing of the first and second annular outlet streams is initiated with the first and second extruders, respectively. In addition, the producing of the third annular outlet stream is accomplished by merging the first and second outlet streams within a coextrusion head, with these first and second streams being coaxial and preferably, if circular in cross section, concentric. The interposing step includes initially directing the reinforcing elements, in the coextrusion head, to the merger interface, with the directing step including independently and individually totally enveloping each of the reinforcing elements. The interposing step further includes utilizing the movement of the streams for drawing the reinforcing elements into the interface of the streams.

The method of using the apparatus of the present invention also includes the producing of each of the first and second annular hollow outlet streams by delivering inlet streams of elastomeric material, from separate extruders, via separate openings, perpendicularly into the coextrusion head; splitting each of the inlet streams into equal portions; and flowing these equal portions through annular contoured channels for achieving annular outlet streams having a uniform 360° distribution of elastomeric material and a circumferentially uniform exit velocity as well as wall thickness.

The exit velocities of each of the outlet streams is substantially similar, with the pressures of the inlet streams, as delivered into the coextrusion head, being in the range of about 2,500–5,000 psi, whereas the pressures of the outlet streams, at their annular merger interface, drop to a range of about 500–700 psi.

Other features and advantages of the present invention will become more readily understood by persons skilled in the art when following the best mode description in conjunction with the several drawings.

BRIEF DESCRIPTION OF THE DRAWINGS

FIG. 9 is an enlarged fragmentary view taken at the entry end of the coextrusion head showing the reinforcing element entrance area.

FIG. 10 is an enlarged fragmentary elevational view of one of the slots at the entrance and of the coextrusion head shown in FIG. 3.

FIG. 11 is an enlarged fragmentary view taken on lines 11—11 of FIG. 8, which shows the position of the array of guide members near the exit end of the coextrusion head.

FIG. 12 is an enlarged fragmentary view taken on lines 12—12 of FIG. 8 and showing the cross-section through the coextruded reinforced elastomeric ply.

FIG. 13 is an enlarged fragmentary elevational view taken on lines 13—13 of FIG. 6, which shows the center flow divider on the inner flow channel.

FIG. 14 is an enlarged fragmentary section taken on lines 14—14 of FIG. 6 which also shows the flow divider on the inner flow channel.

FIG. 15 is an enlarged sectional view taken on lines 15—15 of FIG. 7 and shows the entry to the inner flow channel through the reinforcing element guide subassembly as well as the flow dividers on both of the inner and outer flow channels.

FIG. 16 is an enlarged elevational fragmentary view taken on lines 16—16 of FIG. 15 and shows the guide members routed around the extrudate opening to the inner flow channel together with the locating grooves near the exit end of the coextrusion head, namely on the inner member of the reinforcing element guide subassembly.

FIG. 17 is an enlarged elevational fragmentary view taken on lines 17—17 of FIG. 15 and shows one of the spacing ribs between the inner and outer members of the reinforcing element guide subassembly together with the locating grooves, near the exit end of the coextrusion head, on the inner member of the reinforcing guide subassembly.

BEST MODE FOR CARRYING OUT THE INVENTION

Figure 1:
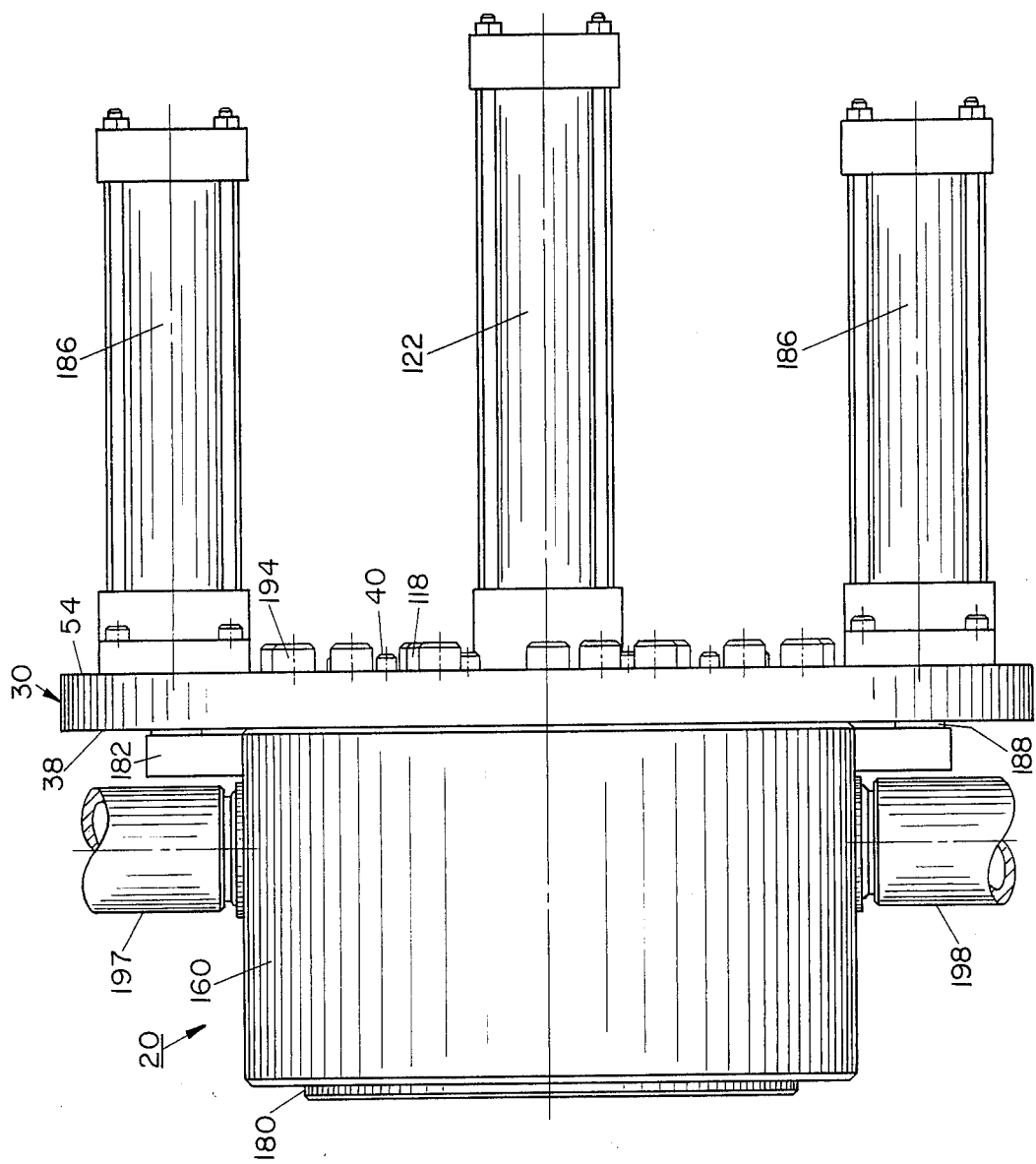
FIG. 1 is a top plan view of the coextrusion head of the present invention.

Referring now to the drawings, specifically to FIG. 1, there is illustrated a top plan view of the coextrusion head generally denominated by the numeral 20, of the present invention. Coextrusion head 20 is comprised of three main elements; namely, reinforcing element guide subassembly 22, (best shown in FIGS. 4 and 6), inner die assembly 24 (best shown in FIGS. 5 and 6) and outer die assembly 26 (best shown in FIG. 7), all of which will be discussed in more detail hereinafter. Coextrusion head 20 is utilized to produce a tubular elastomeric ply best shown in FIGS. 8 and 12.

Figure 4:
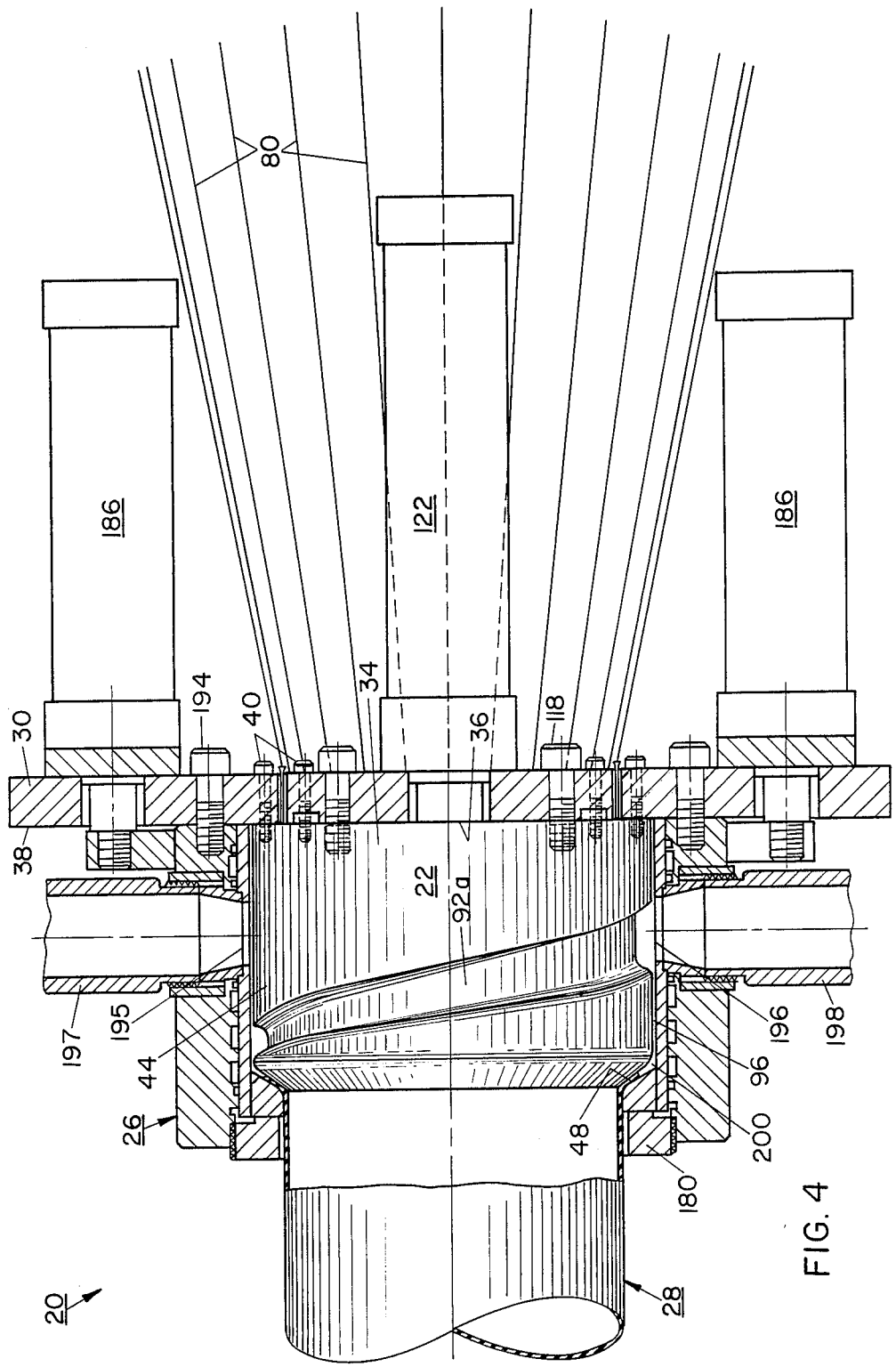
FIG. 4 is a horizontal sectional view, in a longitudinal direction taken along lines 4—4 in FIG. 3 wherein the head is in its closed position, with the outer distribution channel being shown in elevation.
Figure 6:
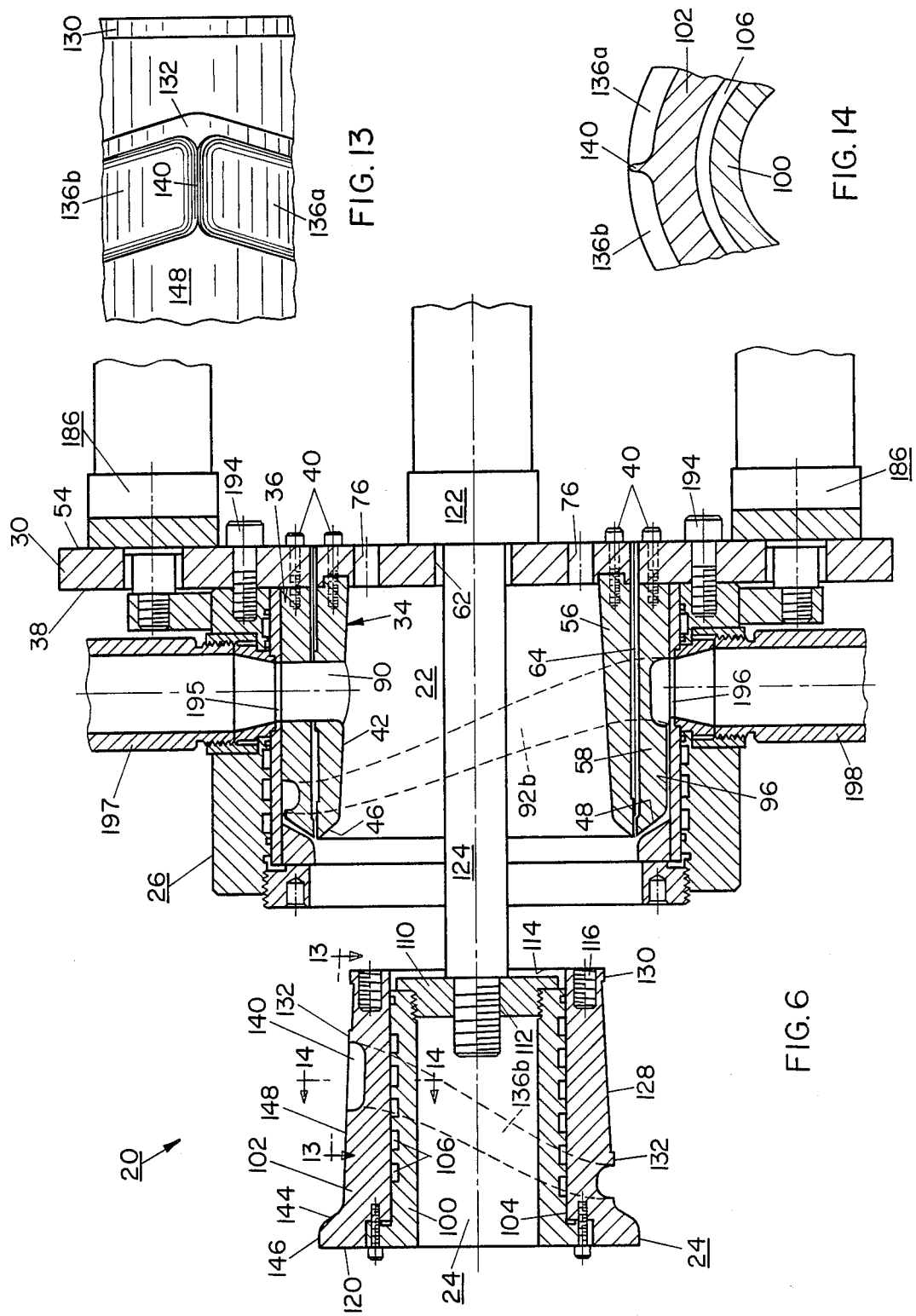
FIG. 6 is a horizontal sectional view, similar to that of FIGS. 4 and 5, with the inner die assembly being shown in its open position.
Figure 8:
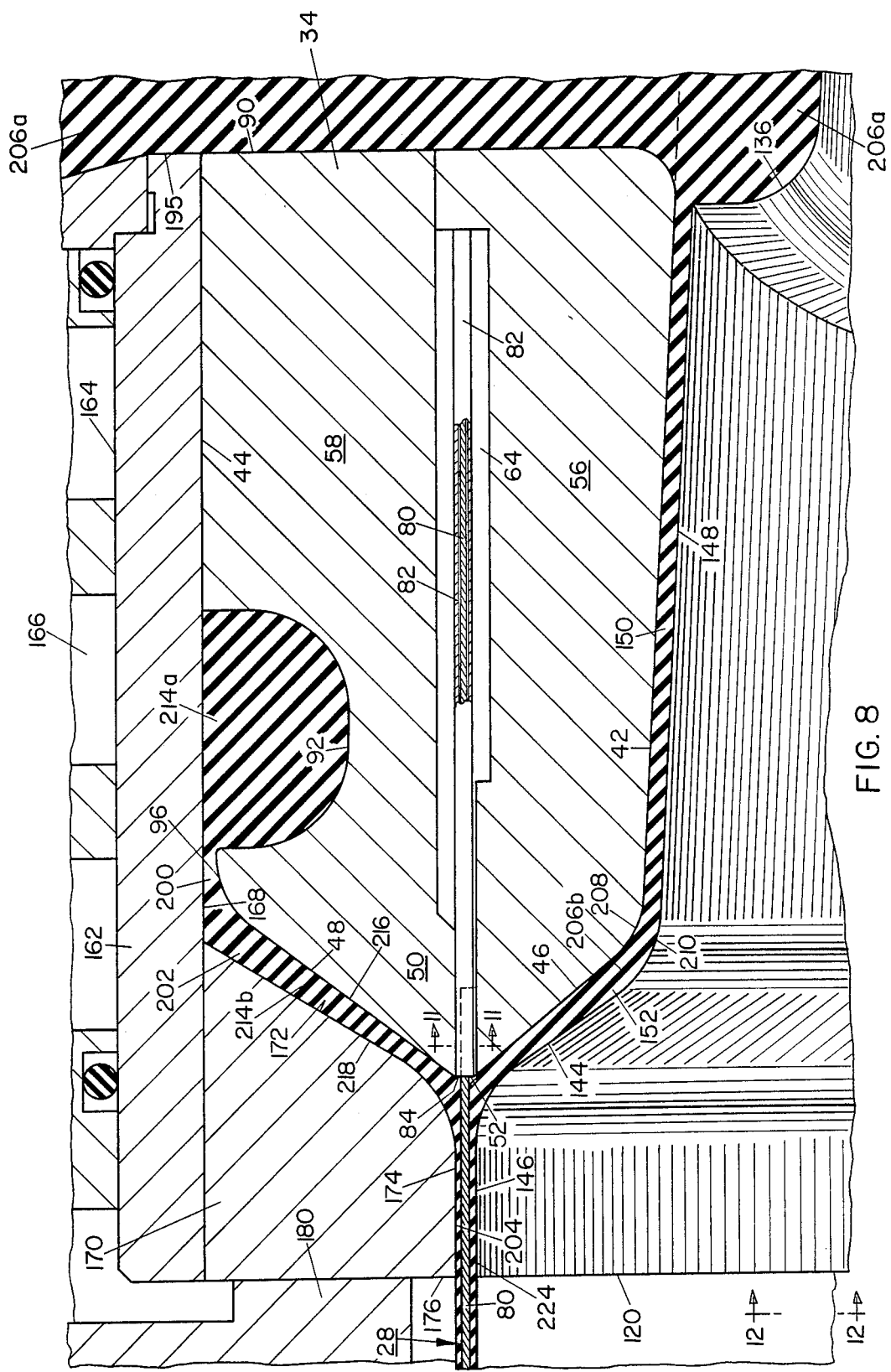
FIG. 8 is an enlarged fragmentary view of the exit end of the die or extrusion device which shows the reinforcing element guide member mounting within the guide subassembly as well as the extrudate path.

Reinforcing element guide subassembly 22, as best seen in FIGS. 4 and 6, includes a back or support plate 30 whose lower portion 32 (FIG. 2) may be provided with a base portion (not shown) for the support thereof relative to any desired type of substrate, be it vertical, horizontal or angulated therebetween. As best seen in FIGS. 4 and 6, reinforcing element guide subassembly 22 includes a generally annular guide element 34 whose inner axial end surface 36 is physically located on and rigidly attached to back plate front surface 38 by a plurality of circumferentially spaced bolts 40. Inner wall surface 42 (FIG. 6) of guide element 34 is preferably outwardly tapered for reasons to be described hereinafter, while its outer wall surface 44 is preferably cylindrical. As best seen in FIG. 8, the axial outer end portions 46 and 48 of wall surfaces 42 and 44 respectively, converge to form an annular tapered end portion 50, being a solid of revolution, having a generally trapezoidal outline (not shown per se) in full transverse section, or being of a generally trapezoidal shape (FIG. 8) in radial section. Portion 50 has an included angle, between surfaces 46 and 48, ranging from about 30° to about 180°, but is preferably in the 100°–120° range and has a narrow annular end surface 52 which is perpendicular to the axial extent of guide element 34.

For ease of manufacture, annular guide element 34 is preferably made up of concentric inner and outer press or interference-fitted annular portions 56, 58 that are spaced from one another via a plurality of intermediate spacing ribs 60 in the manner best shown in FIGS. 15-17, thus producing a plurality of circumferentially-spaced arcuate axial openings 64 between annular portions 56 and 58. Spacing or locating ribs 60, which maintain concentricity between inner and outer annular guide element portions 56, 58 respectively, have their forward or inner portions 68, tapering together to a point in a manner best shown in FIGS. 16 and 17. In addition, the axial extent of tapered portions 68 stops prior to reaching annular tapered end portion 50 thus permitting an annular circumferential space 70 best seen in FIG. 11, to exist between guide element portions 56 and 58. In addition, in the area of guide element tapered end portion 50, inner annular portion 56 is provided with a cirbumferentially arranged, axially directed, series of spaced serrations or notches 72 (best seen in FIGS. 8, 11, 16 and 17).

Figure 3:
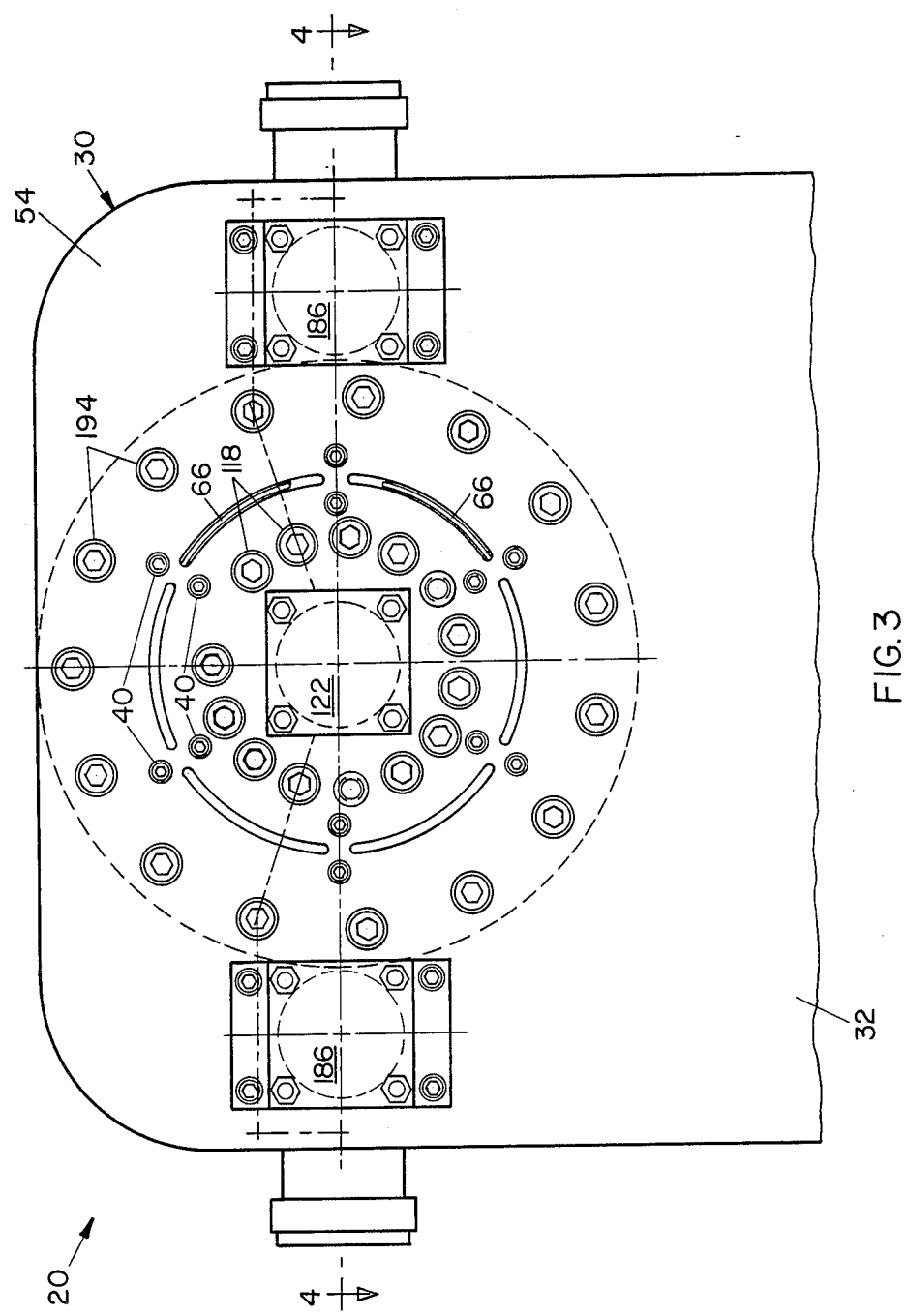
FIG. 3 is a rear elevational view of the reinforcing element entrance end of the coextrusion head.

The innermost ends of arcuate axial openings 64, i.e. those adjacent to back plate front surface 38, are aligned with corresponding pluralities of circumferentially spaced arcuate openings 66 extending through back plate 30 as best seen in FIGS. 3 and 9.

As will be described in more detail later, the elongated, circumferentially continuous preferably tubular, elastomeric body or ply 28 produced via the use of coextrusion head 20 incorporates one or more closely-spaced large orderly groupings or arrays of parallel reinforcing elements 80, best seen in FIG. 12, which generally take the form of filaments, threads, yarns or cords including, but not limited to, natural or synthetic textiles (cotton, nylon, polyester, rayon, aramid or hybrids thereof), steel wire or fiberglass, etc. A ply is made up of a plurality of closely spaced reinforcing elements precisely skimmed wherein each element is fully surrounded by elastomeric material. The term "ply" may also further be defined as one of a number of layers of reinforced fabrics used in a tire construction. Reinforcing elements 80, which are shown in FIG. 12 as a staggered array, could of course also be in one or more spaced linear or curvilinear arrays, if so desired. In order to direct such a plurality of reinforcing elements into coextrusion head 20, each reinforcing element is separately and independently guided into and at least partially through coextrusion head 20 via one or more of closely-spaced arrays of adjacent guide means 82 that take the form of thin-walled, deformable, semi-rigid conformable tubes, preferably of metallic composition, which direct and accurately position the circular array of individual reinforcing elements 80. Guide means 82 are axially directed through back plate openings 66 and guide element openings 64, around spacing ribs 60, into annular circumferential space 70, with the guide means axial outlet end faces 84 being coplanar with guide element narrow annular end surface 52 (see FIG. 8). As best seen in FIG. 11, the arrays of guide means 82 are received either in serrations 72 or between each other and are thus uniformly spaced around the entire 360° extent of annular space 70. Preferably guide means 82 are replacably secured in annular space 70 via curable adhesive, soldering or brazing (not shown), etc. Guide means 82 may be arranged in one or more linear or staggered arrays. Naturally, their placement is limited by the outside diameters of the individual tubes. As best seen in FIG. 9, guide means axial inlet portions 86 are flared in order to prevent the chafing of reinforcing elements 80.

Annular guide element 34 is also provided with a transverse bore or aperture 90, which bore extends through one of the spacing ribs 60 (FIG. 16) in order to convey elastomeric material through the guide array. In addition, guide element outer annular portion 58 is also provided with a 360° annular contoured channel 92 of varying cross section, with channel 92 being made up of two substantially similar and angularly directed 180° portions 92a, 92b which emanate from an axial flow divider 94 (FIG. 15) which in turn is preferably located in the same plane containing the axis of coextrusion head 20, but 180° removed from aperture 90.

Another of the main elements of coextrusion head 20 is inner annular die assembly 24, best seen in FIG. 6, which is preferably made up of an inner cylindrical portion 100 which is physically secured to outer, generally tapered or frustoconical, portion 102. The interface 104 between inner and outer portions 100, 102 respectively, is provided with a temperature control means, which preferably takes the form of channels 106 that may be used for circulating fluid for temperature control purposes in a manner well known in the art. The rear end of annular portion 100 is provided with a stepped annular cap member 110 which in turn is provided with a threaded central aperture 112. The axial outer end face of assembly 24 is provided with an annular outer end face 120. The axial inner end face 114 of outer annular portion 102 is provided with a plurality of circumferentially spaced threaded blind holes 116 which are angularly aligned with similar pluralities of apertures 76 in back plate 30 thus permitting the attachment of inner die assembly 24 to back plate 30 via pluralities of bolts 118.

Attached to rear surface 54 of back plate 30 is a dual acting fluid pressure operated piston cylinder apparatus 122 whose threaded distal piston rod end 124, extending through back plate aperture 62, is physically secured in threaded cap member aperture 112, so that upon the removal of bolts 118, piston-cylinder apparatus 122 can translate inner die assembly 24 and back plate 30 relative to one another.

The outer wall surface 128 of inner die outer annular portion 102 is tapered outwardly, starting from axial rear end face 114 and is provided with a circumferential first or rear land portion 130 and a second or intermediate contoured peripheral land portion 132, which are adapted to mate with and be seated on inner wall surface 42 of annular guide element 34 so as to concentrically and sealingly position inner die assembly 24 relative to reinforcing guide subassembly 22. Inner die outer portion 102 is also provided, on its outer wall surface 128, with a 360° annular contoured channel 136 of varying cross section, with channel 136 being made up of two 180° portions 136a, 136b emanating from an axial flow divider 140 (FIGS. 13, 15 and 16), with flow divider 140 essentially bisecting the radial inner end of aperture 90. It should also be noted that land area or portion 132 follows the contour of channel 136 at its rearward or inner end, as best seen in FIG. 13.

Inner die outer wall surface 128 is also provided, toward its axially outermost portion with a tapered or contoured portion 144 which merges into a further substantially cylindrical portion 146 that forms the axially outermost portion of inner die assembly 24. Contoured portion 144, on its inner end, merges into that peripheral portion 148 of outer wall surface 128 that is located axially outwardly of channel 136, with land portion 148 acting as a third or outer land portion of wall surface 128.

Inner die peripheral wall portion 148 cooperates with element guide wall surface 42 to define, therebetween, a first generally annular tubular extrudate path 150 (as best seen in FIG. 8). Furthermore, inner die wall contoured portion 144 cooperates with reinforcing element guide axial outer portion 46 to define annular inner die throat 152 therebetween.

Figure 7:
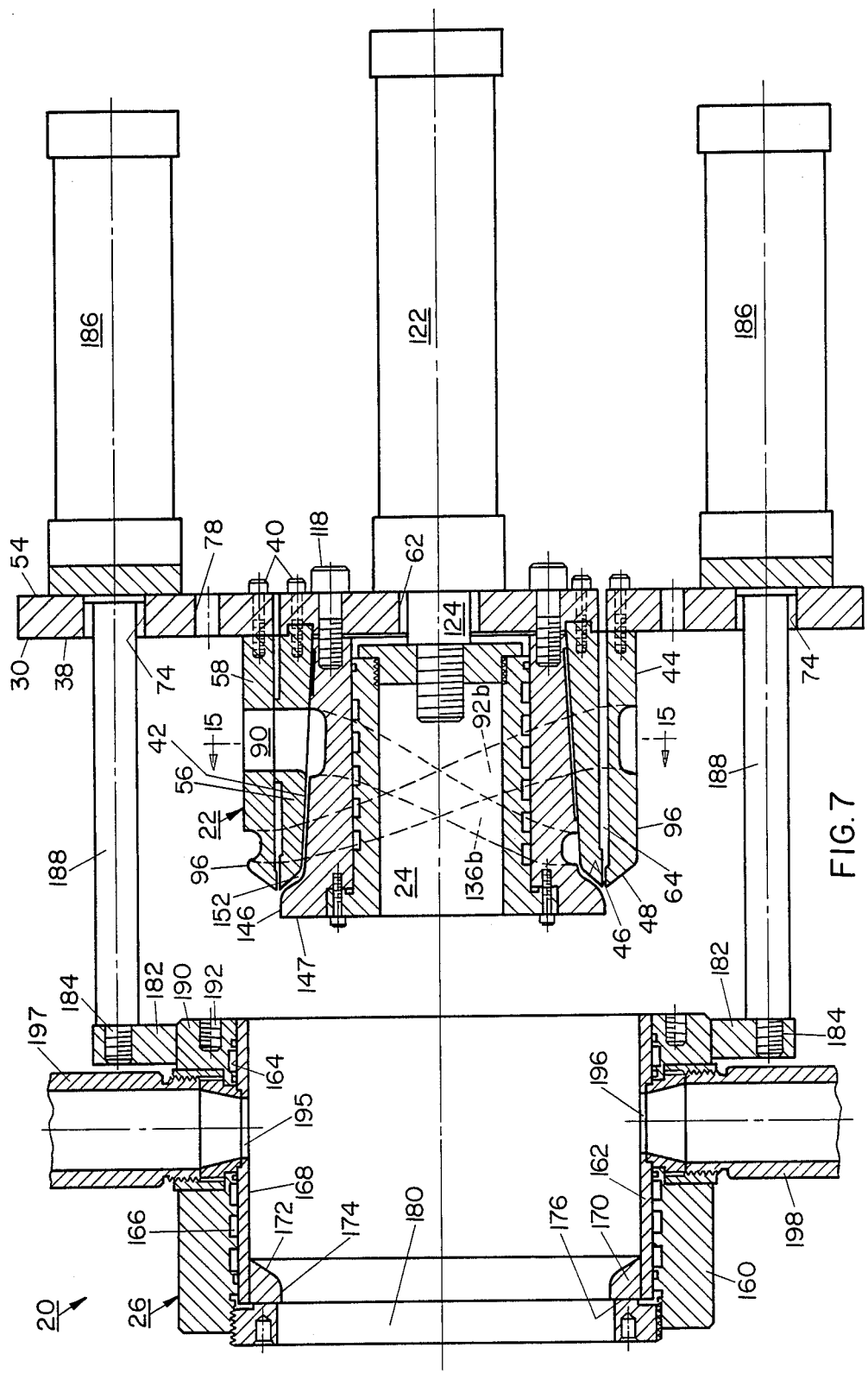
FIG. 7 is a horizontal sectional view, similar to that of FIG. 6, but with the outer die assembly being shown in its open position.

Turning now to outer die assembly 26, best shown in FIG. 7, it includes an outer cylindrical shell 160 and a mating concentric inner cylindrical sleeve 162, with the interface 164 therebetween being provided with temperature control means, which preferably takes the form of channels 166 that may be used for circulating fluids. Matingly located on the inner peripheral surface 168 of cylindrical sleeve 162, adjacent to its outer end surface, is outer die element 170 whose inner wall surface is comprised of a tapered or contoured portion 172 that merges smoothly into a cylindrical portion 174. The included angle between contoured surfaces 172 and 144 (FIG. 8), which cooperate to define a generally inwardly tapered or converging annular shape, can range from about 180° to 40°, but is preferably in the 130°-110° range. Die element 170 also has an annular outer end surface 176, with a externally threaded ring member 180, mating with an internally threaded portion of outer shell 160, bearing against end surface 176.

As previously noted, contoured channel 92 (FIGS. 4, 7 and 8) is provided in guide element portion 58, but if desired, channel 92 could also be provided, with proper redesign, in inner surface 168 of outer die cylindrical sleeve 160. In addition, circumferential portions of channel 92 could be provided in both guide element portion 58 and cylindrical sleeve 160. Furthermore, while contoured channel 136 is provided in inner die outer wall surface 128, it could also be provided, with proper redesign, in inner surface 42 of annular guide element 34. Further yet, circumferential portions of channel 136 could be provided in both inner die outer wall surface 128 and guide element inner surface 42.

Outer shell 160 (FIG. 7) of outer die assembly 26 is also provided with two oppositely directed and transversely extending rear attachment portions 182, each having a threaded aperture 184 that serve to receive the distal threaded ends of piston rods 188 of a pair of dual acting fluid pressure operated piston and cylinder devices 186. These devices, whose piston rods extend through back plate apertures 74 and which are physically attached to the back plate rear surface 54, are utilized for translating reinforcing element guide subassembly 22 and outer die assembly 26 relative to one another. The axial rear end face 190 of outer shell 160 is provided with a circumferentially spaced plurality of threaded blind holes 192 which are angularly aligned with apertures 78 in back plate 30 so that outer die assembly 26 can be rigidly attached to reinforcing element guide subassembly 22 via bolts 194.

Figure 5:
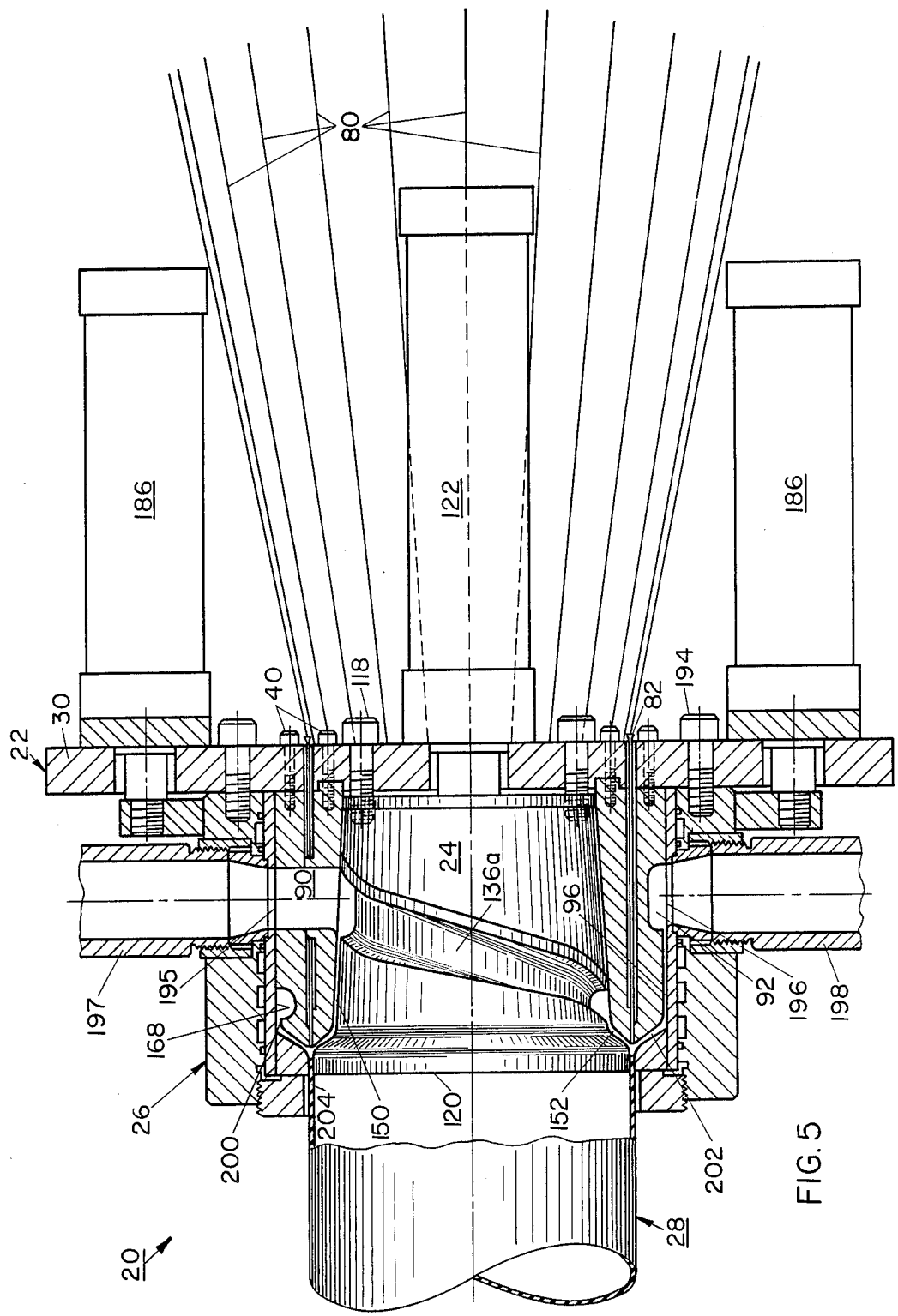
FIG. 5 is a horizontal sectional view, substantially similar to that of FIG. 4, but with the inner distribution channel being shown in elevation.

Outer die assembly 26 is also provided with two diametrically opposed threaded stepped apertures 195, 196 extending through cylindrical shell 160 and sleeve 162. Threadably received within apertures 195, 196 are the proximate ends of delivery conduits 197, 198 respectively, whose distal ends are connected to the outputs of preferably two seperate extruders (not shown). In the closed condition of coextrusion head 20, as best shown in FIGS. 4 and 5, the angular alignments of reinforcing element guide subassembly 22, inner die assembly 24 and outer die assembly 26 are such that outer die element transverse aperture 195 is aligned with annular guide element transverse aperture 90, the latter also being axially centered relative to axial flow divider 140 of inner die assembly distribution channel 136. Similarly, as best seen in FIGS. 4 and 15, outer die assembly transverse aperture 196 is aligned with distribution channel 92 of reinforcing guide subassembly 22 in that its axial flow divider 94 is essentially axially centered relative to aperture 196.

As best seen in FIGS. 7 and 8, the peripheral or land portion 96, of outer guide element outer wall surface 44 that is axially outwardly of distribution channel 92 cooperates with that portion of the inner surface 168 of outer cylindrical sleeve 162, corresponding to land portion 96, to define therebetween, a second generally tubular extrudate path 200. Furthermore, outer die wall contoured portion 172 cooperates with element guide axial outer portion 48 to define annular outer die throat 202 therebetween.

Again as best seen in FIG. 8, first and second extrudate paths 150 and 200 merge together into a third generally tubular extrudate path 204 which is defined between outer die cylindrical surface portion 174 and inner die cylindrical surface portion 146.

As best seen in FIG. 5, a first extruder (not shown) delivers a first single inlet stream 206a (FIG. 8) of elastomeric stock via conduit 197, through aligned apertures 195 and 90 into inner or first distribution channel 136, with central flow divider 140 (FIGS. 13, 14, 15) essentially halving or equally splitting stream 206a so that the portions thereof flow in channel portions 136a, 136b to achieve a 360° distribution, with channel 136 of course cooperating with a corresponding portion of annular element guide inner wall surface 42 so as to define, in total, a covered first distribution channel 136 of varying cross section. As best seen in FIG. 13, land area 132 borders the rear or inner contours of the channels 136a, 136b whereas the front contours of these channels merge into generally annular tubular extrudate path 150 so as to produce first annular tubular or outlet stream 206b, as best seen in FIG. 8. Elastomeric stock outlet stream 206b, having inner and outer cylindrical surfaces 208, 210, respectively, then proceeds to flow through first extrudate path 150 and inner die throat 152.

In a manner similar to that described hereinabove, a second single inlet stream 214a of elastomeric stock (FIG. 8), preferably from a second extruder (not shown), enters through delivery conduit 198 and aperture 196, into 360° annular contoured channel 92, which as previously noted, is made up of two substantially similar and angularly opposite directed 180° portions 92a, 92b, which emanate from axial flow divider 96 (FIGS. 15, 16). Channels 92a, 92b provide the required 360° distribution of elastomeric stock stream 214, with stream 214 flowing from channels 92a, 92b axially outwardly through second extrudate path 200 so as to produce second annular tubular or outlet stream 214b, as best seen in FIG. 8. Outlet stream 214b, having inner and outer cylindrical surfaces 216, 218 respectively, then proceeds to flow through second extrudate path 200 and outer die throat 202.

Again as best seen in FIGS. 8 and 12, first and second outlet streams 206b and 214b of elastomeric stock merge together, into third outlet stream 224, in the area of narrow annular end surface 52 of annular guide element annular end portion 50. Stream inner surfaces 208 and 216 form a coplaner interface or stock junction 220 (schematically shown in FIG. 12) between outlet streams 206b and 214b, respectively.

As its name implies, reinforcing element guide subassembly 22 serves to retain and guide a plurality of reinforcing elements or cords 80. Each reinforcing element 80 is separately and independently guided into interface 220 between merging outlet streams 206b and 214b of elastomeric stock in the area of end face 50 of annular guide element 34. As previously noted, this guiding function is provided by one or more closely-spaced arrays of adjacent guide means 82 as best seen in FIGS. 8–11 and 16. As noted, the axial end surfaces 84 of guide means 82 are coplaner with guide element narrow annular end surface 52 and thus serve to precisely locate and feed reinforcing elements 80 into interface 220, defined by juxtaposed elastomer stock stream inner cylindrical surfaces 208 and 216. The resultant force of merging outlet streams 206b and 214b, into third outlet stream 224 (FIG. 8), serves to draw reinforcing elements 80 into and through coextrusion head 20. The thickness 222 (FIG. 12) of elastomeric body 28, which is comprised of merged outlet streams 206b and 214b, having reinforcing elements 80 embedded therein, is of course controlled by a third extrudate path 204, i.e., the spacing, throat or orifice between inner die surface 146 and outer die surface 174.

The coextrusion of elastomeric tubular ply 28 can be accomplished either horizontally, vertically or any angular position therebetween. Samples of such reinforced elastomeric plies have been successfully coextruded wherein the diameter of the tubular plies ranged from 2 to about 16 inches, the wall thickness ranged from about 0.045 to about 0.125 inches, with said tubular plies having end counts ranging from 6 to 48 parallel reinforcing elements per circumferential inch, said reinforcing elements being arranged in either curvilinear, i.e., circumferentially spaced or staggered arrays.

It should be understood from the previous description that, in terms of operation, looking at FIG. 5, for example, one extruder delivers a first or inner inlet stream of elastomeric stock 206a (FIG. 8), through a single opening 90 into flow channel 136. The pressure drop from the inlet, at aperture 90, to the furthest outlet, which is 180° angularly removed therefrom (via channels 136a, 136b, to first extrudate path 150) must match the resistance in said flow channels, from the inlet to the nearest outlet, since equal pressure is necessary in the 360° expanse of outlet stream 206b in order to achieve equal exit velocity. Therefore, the sizings of channel 136 and extrudate path 150 are of primary importance in order to achieve the desired matched uniform axial velocity and mass flow rate in the extrudate.

The same condition exists with reference to the second or outer inlet stream 214a of elastomeric stock which enters distribution channel 92 through single opening 196, with stream 214a preferably being supplied by an independent extruder. The pressure and exit velocities of both outlet streams 206b and 214b, if of equal thickness, must be the same in order to achieve a uniform extrudate. While outlet streams 206b and 214b need not be of the same thickness, their exit velocities must be substantially matched. Furthermore the inlets 195, 196 for inlet streams 206a, and 214a, while preferably coplanar, should be rotated 180° from another.

Various known design equations can be used to address the important material properties of viscosity as well as temperature dependence of flow rate characteristics to determine the appropriate contours, depths, land lengths and land restricted lengths, of channels 92 and 136 as well as extrudate paths 150 and 200, to obtain the desired uniformity of flows in streams 206b, 214b which will be reasonably insensitive to minor changes of elastomeric stock properties while maintaining desired tolerances and production capabilities.

As noted, guide means 82 served to precisely direct, locate, space and feed reinforcing elements 80 into an interface 220 between inner and outer outlet streams 206b, 214b, respectively. Reinforcing elements 80 are always located at stream interface 220, but not necessarily centered between streams 206b and 214b. The mass flow ratios of streams 206b and 214b must be constant in order to maintain a constant product, but, by varying one or both of streams 206b, 214b the interface 220 therebetween can be shifted, thereby changing the radial location of reinforcing elements 80, relative to tubular elastomeric ply 28.

Elastomeric stock outlet streams 206b and 214b have a merging stream pressure value of about one-fourth of that at the entrance to their flow channels 136 and 92, respectively. Nominally, the inlet pressures supplied to delivery conduits or feed tubes 197, 198 are in the ranges of about 2500–5000 psi. At the merging of streams 206b and 214b, these pressures drop to a range of about 500–700 psi, while at the exit, from coextrusion head 20, the pressures have of course dropped to zero. While the temperature of streams 206 and 214 of elastomeric stock and their viscous properties influence the pressure values, a minimum pressure is observed with the balanced and precisely positioned die orifice defined by third extrudate path 204 (FIG. 8).

Streams 206b and 214b have force components which can draw the reinforcing elements 80 into said streams at their interface 220. Therefore, it is possible to replace a broken reinforcing element 80, since, due to the geometry of extrudate paths 150 and 200, there is no large pressure gradient that goes back into guide means 82. If one reinforcing element 80 should break, there is only about an one-eighth inch plug of elastomeric stock backflow into guide means 82. This plug can readily be dislodged in an axially outward direction via a stiff, high modulus object, such as a multifilament steel cord, solid wire, or a rigid plastic monofilament that can be manually inserted into the plugged reinforcing guide means or tube 82 from flared opening 86. Such an insertion may be accomplished while coextrusion head 20 is in operation, at low speed, and its operation can be continued with the full complement of reinforcing elements 80, wherein the high modulus leader being used in front of the desired replacement cord reinforcement element.

Figure 2:
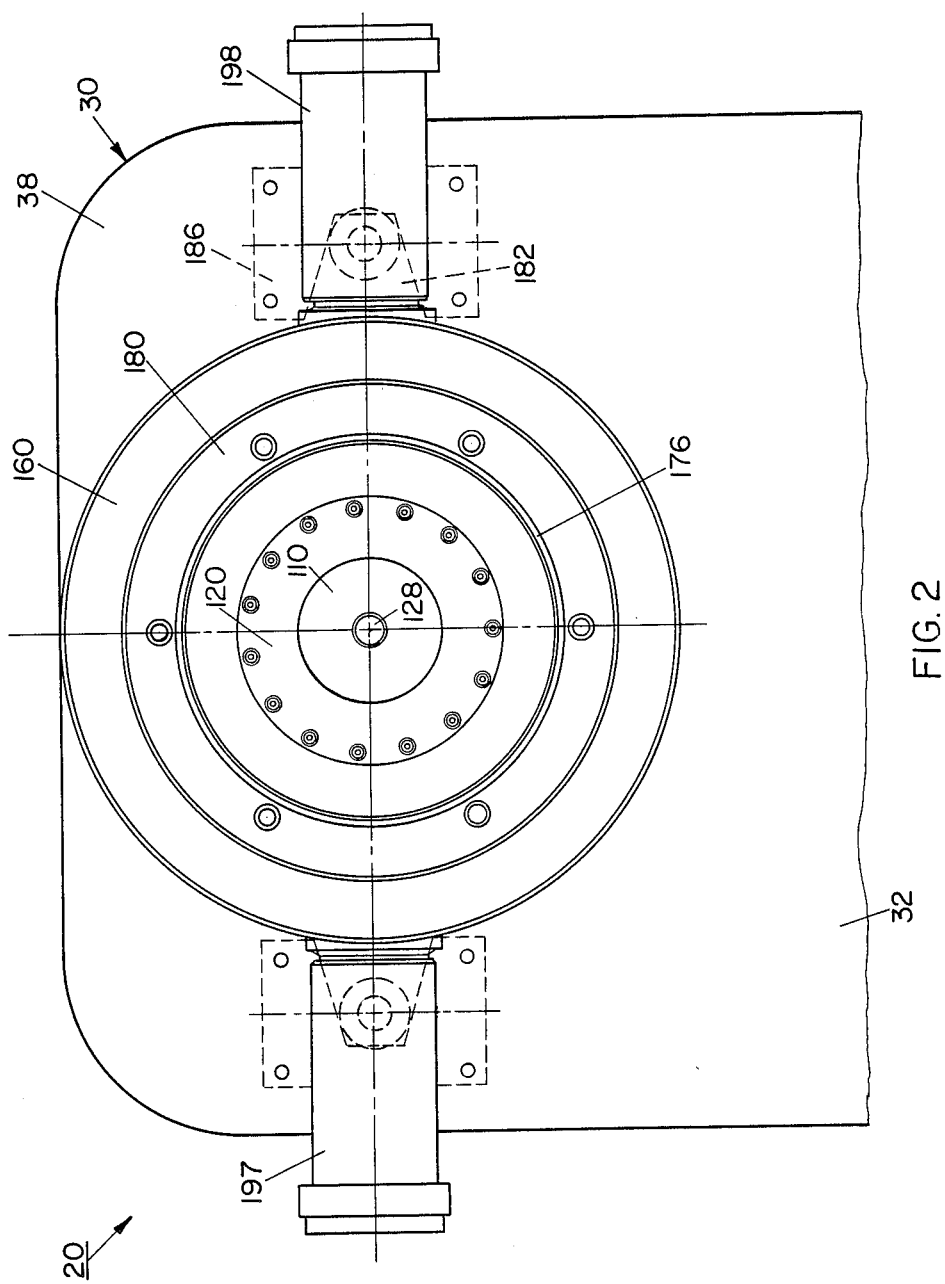
FIG. 2 is a front elevational view of the exit end of the coextrusion head.

As noted, in order to produce, for example, a 13 inch diameter tubular extrudate having a uniform circumferential wall thickness of about 0.070 inches (±0.004 inches), one must be able to assemble, disassemble and operate coextrusion head 20 within the required tolerances. In order to maintain this type of precision, one must minimize the number of individual components within the coextrusion head. As noted, coextrusion head 20 is made up of three main elements; namely reinforcing element guide subassembly 22, inner die assembly 24 and outer die assembly 26. As shown in the several drawings, inner die assembly 24 (FIG. 6) and outer die assembly 26 (FIG. 7) or both, with reference to reinforcing element guide subassembly 22, can be translated relative to one another for any required servicing, etc. Inner die assembly 24 is provided with land portions 130, 132 for mating and seating relative to guide element inner wall surface 42, in order to maintain the concentricity between guide subassembly 22 and inner die member 24. Furthermore, there is an extremely close tolerance fit between outer wall surface 44 of guide subassembly 22 and inner surface 168 of outer die inner sleeve 162, again in order to maintain the necessary concentricity between guide subassembly 22 and outer die assembly 26. If desired, surfaces 44 and 168 could also be tapered. Temperature fluid control channels 106 and 166 are utilized by the inner and outer die assemblies, respectively in order to permit heating and cooling of said die assemblies since initially the dies must be heated, but after coextrusion is underway they must be cooled in order to maintain the desired operating temperatures. Tensioning means, not shown, located externally of coextrusion head 20, may take any desired form or shape. A typical biased or tensioned reel is shown in FIG. 2 of U.S. Pat. No. 4,484,966 to Kawamoto.

As previously explained, a large number of reinforcing elements 80 may be required, which preferably emanate from individual spools, ribbons or beams (none shown) in a manner well known in the art. In order to maintain control of the geometrical shape and gage tolerance of tubular ply 28 (FIGS. 8 and 12), ply 28 and each of its reinforcing elements 80 must be tensioned, with this tension ranging from about 30 to about 195 grams, per individual reinforcing element 80, depending on stock temperature, viscosity and flow rate, etc.

It has been determined that the difference between the inside diameter of each guide means 82 and the nominal diameter of reinforcing elements 80 should be minimal, otherwise there will be excessive backflow of the elastomeric material into guide means 82. Ideally this difference should be about 0.002 inches, but this requires a perfect cord supply, i.e., one without knots, slubs or splices. Successful operation has been accomplished with such perfect cords of 0.028 inch diameter travelling through guide tubes of nominally 0.0325 inch inside diameter. Thus, the ratio between the nominal diameter of reinforcing elements 80 and the inside diameter of guide means 82 should be less than a factor of 2.

While it is possible to use but one extruder and split the extrudate emanating therefrom, it is easier to control individual separate extruders for producing elastomeric stock inlet streams 206a and 214a. If desired, multiple extruders could be used to produce each of inlet streams 206a and 214a, with these extruders forming successive arcs of the required 360° stream distribution. In order to achieve a uniform pressure drop and velocity at the exit of elastomeric body 28, from coextrusion head 20, for the full 360°, the pressure drop in both streams has to be the same. Computer control is preferably utilized to control the ratio of the two extruder feed rates and speed (rpm) control, together with temperature control. Naturally the rheological prediction of the behavior of the elastomeric compositions utilized will influence the varying cross sections of channels 92 and 136. In addition, the tension on all the reinforcing elements must be uniform and, as can be seen in the several drawings, in order to achieve the same pressure drop over the entire 360° extent, the effective length/diameter ratio of extrudate paths 150 and 200 is varied. Furthermore, it is also possible to shift the radial position of the interface between the two flow streams by changing the dimensions and/or the spacing between the inner and outer die assemblies.

Tubular elastomeric ply 28 of the present invention finds utility in a myriad of applications requiring tubular elements—be they tubes, belts, tire bodies, air springs, shock sleeves and the like. For such applications, as tubular elastomeric ply 28 emanates from coextrusion head 20, it is preferably guided and severed circumferentially, in any desired manner, prior to undergoing further operational shaping, assembly and curing steps. Not only are the reinforcing elements closely packed, precisely spaced and uniformly surrounded by elastomeric matrix material, but also and very importantly so, because of the tubular configuration, there is no splice, no overlap, no out-of-roundness and no static or dynamic force imbalance. X-ray inspections of cured tires utilizing body plies of the tubular elastomeric components, produced by the apparatus and method of this invention, reveal a remarkable uniformity of reinforcing element placement.

Tubular elastomeric ply 28 also finds additional utility in terms of sheets or strips of any desired length that can be produced by longitudinal severing, such as by splitting or slitting, etc. Such severing can be accomplished in any desired manner as, or after, tubular elastomeric ply 28 emanates from coextrusion head 20. The resulting sheets or strips can thereafter be severed or processed into any desired geometric configurational shapes or products which are later cured to form mechanical goods for useful industrial and consumer applications. The uniformity of gage and reinforcing element placement of said resulting sheets or strips, via their production from a tubular ply, is further enhanced by the negation of the usual edge effects that are unavoidably present in the production of extruded flat strips, sheets or ribbons.

It should be understood that the term elastomeric is deemed to further include elastoviscous and plastic materials. Furthermore, if desired, the two streams 206 and 214 of elastomeric material that are combined to form the matrix for elastomeric ply 28 may be of differing compositions and/or thicknesses. In addition, adjacent reinforcing members 80 may be of differing compositions and/or thicknesses, or there may be one or more staggered or curvilinear arrays of such members. Further yet, while the die assemblies of the present invention are preferably configured so as to produce a tubular extrudate, such as a hollow right circular cylinder, said configuration can also include other cylindrical shapes whose cross sections are other than cylindrical, i.e. oval, for example.

From the foregoing description, and the operational discussion, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. For example, multiple concentric circular arrays of reinforcing elements could be utilized, as long as each such array is drawn into the merging interface of two streams of elastomeric material. As a result, the embodiments described herein are subject to various modifications, changes and the like without departing from the spirit and scope of the invention, with the latter being determined solely by reference to the claims appended hereto.

What is claimed is:

1. A coextrusion head for producing a generally tubular elastomeric ply made up of first and second coaxial tubular streams of elastomeric materials having interposed adjacent to their interface a closely and uniformly spaced large array of parallel and independent reinforcing elements, said coextrusion head comprising in combination:
(a) a reinforcing element guide subassembly including a generally annular guide element having an outer wall surface and an inner wall surface as well as axially-directed guide means for individually and independently directing and accurately positioning a circular array of closely and uniformly spaced individual reinforcing elements;
(b) a generally annular inner die assembly, having inner and outer wall surfaces, coaxial with and located substantially radially inwardly of said annular guide element, at least one of said annular guide element and said inner die assembly having a 360° annular contoured channel in the wall surface, opposed to the wall surface of the other, said channel together with said opposed wall surface forming a first distribution channel;
(c) a generally annular outer die assembly, having inner and outer wall surfaces, coaxial with and located substantially radially outwardly of said annular guide element;
(d) at least one of said annular guide and said outer die assembly having a 360° annular channel in the wall surface opposed to the wall surface of the other, said channel together with said opposed wall surface forming a second distribution channel;
(e) the axial outer portions of the inner and outer wall surfaces of said annular guide element having converging portions merging into an end portion having a narrow annular outer end surface with said guide means having axial outlet end faces co-planar with said guide element narrow annular end surface;
(f) a portion of the outer wall surface of said inner die assembly and a portion of the inner wall surface of said annular guide element, both axially outward of said first distribution channel, cooperating to form a first generally tubular extrudate path;
(g) a portion of the outer wall surface of said annular guide element and a portion of the inner wall surface of said outer die assembly,, both axially outward of said second distribution channel, cooperating to form a second generally tubular extrudate path;
(h) the axially outermost portions of the inner wall surface of said outer die and the outer wall surface of said inner die cooperating to form a third generally tubular extrudate path, said first and second extrudate paths merging together into said third generally tubular extrudate path at the narrow annular end surface of said guide element;
(i) first and second inlet streams of elastomeric materials enter said first and second distribution channels and consequently said first and second annular tubular extrudate paths, respectively, and produce said first and second tubular streams which merge together into a combined third tubular stream of elastomeric material in said third extrudate path;
(j) said individual reinforcing elements being introduced into the interface between said first and second streams of tubular elastomeric material as they merge together simultaneously with said individually and independently guided reinforcing elements into said third tubular stream of elastomeric material thus producing said tubular elastomeric ply that is internally provided with said closely and uniformly spaced array of parallel reinforcing elements.

2. The coextrusion head of claim 1 wherein said guide means for individually and independently directing and accurately positioning said reinforcing elements includes at least one spaced array of adjacent thin walled deformable semi-rigid tubes.

3. The coextrusion head of claim 2 wherein said at least one array of tubes is curvilinear.

4. The coextrusion head of claim 2 wherein said at least one array of tubes is staggered.

5. The coextrusion head of claim 2 wherein the inlet portions of said tubes are flared in order to prevent chafing of said reinforcing elements.

6. The coextrusion head of claim 2 wherein the ratio of the inside diameter of said tubes, relative to the diameter of said reinforcing elements is less than 2 to 1.

7. The coextrusion head of claim 1 wherein said inner die assembly has said 360° annular contoured channel in its outer wall surface, said channel, together with said inner wall surface of said guide subassembly, forming said first distribution channel.

8. The coextrusion head of claim 7 wherein said annular guide element is provided with a radially directed aperture and said outer die assembly is provided with opposed radially-directed first and second apertures, said first aperture, which is aligned with said radially directed aperture in said annular guide element, is also aligned with a corresponding portion of said first 360° distribution channel.

9. The coextrusion head of claim 8 wherein said portion of said first 360° distribution channel, aligned with said first aperture is provided with an axial central flow divider across said first distribution channel.

10. The coextrusion head of claim 9 wherein said first distribution channel is comprised of two substantially similar and angularly oppositely directed 180° portions of varying cross section which emanate from said flow divider.

11. The coextrusion head of claim 1 wherein said guide subassembly has said 360° annular contoured channel in its outer wall surface, said channel together with the inner wall surface of said outer die assembly, forming said second distribution channel.

12. The coextrusion head of claim 11 wherein said outer die assembly is provided with opposed radially-directed first and second apertures, said second aperture being aligned with a corresponding portion of said second 360° distribution channel.

13. The coextrusion head of claim 12 wherein said portion of said second 360° distribution channel, aligned with said second aperture, is provided with an axial central flow divider across said second distribution channel.

14. The coextrusion head of claim 13 wherein said second distribution channel is comprised of two substantially similar and angularly oppositely directed 180° portions of varying cross section which emanate from said flow divider.

15. The coextrusion head of claim 12 wherein said radially directed first and second apertures are located in a common plane and are 180° removed from one another.

16. The coextrusion head of claim 15 wherein said first and second inlet streams of elastomeric material enter said extrusion head via said first and second radially directed apertures in said outer die assembly.

17. The coextrusion head of claim 1 wherein the axial outer portion of said annular guide element inner and outer wall surfaces merge into an annular tapered end portion having an included angle ranging from about 30° to about 180°.

18. The coextrusion head of claim 17 wherein said included angle preferably ranges from 100° to 120°.

19. The coextrusion head of claim 17 wherein said annular tapered end portion is a solid of revolution of generally trapezoidal shape in radial section.

20. The coextrusion head of claim 1 wherein the portion of the outer wall surface of said inner die assembly, which cooperates with a portion of said inner wall surface of said annular guide element to form said first extrudate path, and the portion of the inner wall surface of said outer die assembly, which cooperates with a portion of said outer wall surface of said annular guide element to form said second extrudate path, cooperate to define a generally inwardly tapered annular shape having an included angle ranging from about 180° to about 40°.

21. The coextrusion head of claim 20 wherein said included angle preferably ranges from 130° to 110°.

22. The coextrusion head assembly of claim 1 wherein said element guide subassembly includes a back plate, said inner and outer die assemblies being rigidly secured to said back plate during the operation of said coextrusion head.

23. The coextrusion head assembly of claim 1 wherein said element guide subassembly includes a back plate and first means, mounted on said back plate and operatively interconnected with said inner die assembly, for translating said inner die assembly and said element guide subassembly relative to one another.

24. The coextrusion head assembly of claim 1 wherein said element guide subassembly includes a back plate and second means, mounted on said back plate and operatively interconnected with said outer die assembly, for translating said outer die assembly and said element guide subassembly relative to one another.

25. The coextrusion head of claim 1 wherein said closely spaced array of parallel reinforcing elements is substantially parallel to the direction of coextrusion.

26. The coextrusion head of claim 1 wherein said tubular ply takes the form of a hollow right circular cylinder.

27. The coextrusion head of claim 1 wherein each of said inner and outer die assemblies is provided with independent means for temperature control.

28. A coextrusion head for producing an elongated elastomeric hollow body made up of first and second concentric hollow outlet streams of elastomeric materials having interposed adjacent to their interface a closely-spaced array of parallel reinforcing and independent elements, said coextrusion head comprising in combination:
(a) a reinforcing element guide subassembly including a circumferentially continuous guide element having an outer wall surface and an inner wall surface as well as axially-directed guide means for guiding and accurately positioning, in cross section, a circular array of closely-spaced individual reinforcing elements;
(b) a generally circumferentially continuous inner die assembly, having inner and outer wall surfaces, concentric with said guide element, said inner die assembly having a 360° annular contoured channel in its outer wall surface, said channel together with the inner wall surface of said guide element, forming a first distribution channel;
(c) a generally annular outer die assembly, having inner and outer wall surfaces, concentric with said guide element;
(d) said guide element having a 360° annular channel on its outer wall surface, said channel, together with the inner wall surface of said outer die assembly, forming a second distribution channel;
(e) the axial outer portions of the inner and outer wall surfaces of said guide element having converging portions merging into an annular tapered end portion having a narrow annular end surface;
(f) that portion of the outer wall surface of said inner die assembly and that portion of the inner wall surface of said guide element, both axially outward of said first distribution channel, cooperating to form a first, circumferentially continuous annular tubular, extrudate path;
(g) that portion of the outer wall surface of said guide element and that portion of the inner wall surface of said outer die assembly, both axially outward of said second distribution channel, cooperating to form a second, circumferentially continuous annular, extrudate path;
(h) the axially outermost portions of the inner wall surface of said outer die and the outer wall surface of said inner die cooperating to form a third, circumferentially continuous annular, extrudate path, said first and second extrudate paths merging together into said third extrudate path at the narrow annular end surface of said guide element annular tapered end portion, said narrow end surface including the axial outer end surfaces of said means for guiding and positioning said array of individual reinforcing elements;
(i) first and second inlet streams of elastomeric materials entering said first and second distribution channels and consequently said first and second annular extrudate paths, respectively and produce said first and second hollow outlet streams which merge together into a combined third hollow stream of elastomeric material in said third extrudate path;
(j) said individual reinforcing elements being introduced into the interface between said first and second hollow streams of elastomeric material as they merge together simultaneously with said individually and independently guided reinforcing elements into said third hollow stream of elastomeric material thus producing said elastomeric hollow body that is internally provided with said closely-spaced array of parallel reinforcing elements.

29. The coextrusion head of claim 28 wherein said axially directed guide means for directing and positioning includes at least one circumferentially spaced array of adjacent thin-walled rigid tubes.

30. The coextrusion head of claim 20 wherein the narrow annular end face of the annular tapered end portion of said guide element is coplanar with the axial outer end surfaces of said tubes.

31. The coextrusion head of claim 28 further including means, external of said coextrusion head, for controlling the tension of each of said reinforcing elements and said elastomeric hollow body, said tension being in the range from about 30 to about 195 grams for each of said reinforcing elements.

32. The coextrusion head of claim 28 wherein the pressures of said first and second hollow outlet streams of elastomeric materials, as they merge into said combined third hollow outlet stream is in the range of about one fifth to about one fourth of the value of the pressures of said first and second inlet streams as they enter said coextrusion head.

* * * * *